(12) United States Patent
Tawfik et al.

(10) Patent No.: US 11,603,852 B2
(45) Date of Patent: Mar. 14, 2023

(54) COMPRESSOR BLEED PORT STRUCTURE

(71) Applicant: General Electric Company, Schenectady, NY (US)

(72) Inventors: Jonathan Atef Tawfik, Arlington, MA (US); Jeffrey Miles McMillen Prescott, Somerville, MA (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 15/875,167

(22) Filed: Jan. 19, 2018

(65) Prior Publication Data

US 2019/0226488 A1     Jul. 25, 2019

(51) Int. Cl.
| | |
|---|---|
| *F04D 27/00* | (2006.01) |
| *F04D 29/44* | (2006.01) |
| *F04D 29/42* | (2006.01) |
| *F04D 29/54* | (2006.01) |
| *F04D 29/68* | (2006.01) |
| *F04D 29/32* | (2006.01) |
| *F02C 9/18* | (2006.01) |
| *F04D 29/28* | (2006.01) |

(52) U.S. Cl.
CPC ........ *F04D 27/009* (2013.01); *F04D 29/4206* (2013.01); *F04D 29/444* (2013.01); *F04D 29/542* (2013.01); *F04D 29/681* (2013.01); *F04D 29/682* (2013.01); *F02C 9/18* (2013.01); *F04D 29/284* (2013.01); *F04D 29/321* (2013.01); *F05D 2220/32* (2013.01); *F05D 2250/70* (2013.01)

(58) Field of Classification Search
CPC .. F04D 27/009; F04D 27/0215; F04D 27/023; F04D 15/0027; F04D 29/682; F04D 29/542; F04D 29/284; F04D 29/321; F05D 2220/32; F02C 9/18
See application file for complete search history.

(56) References Cited

U.S. PATENT DOCUMENTS

| | | | |
|---|---|---|---|
| 5,231,825 A | * | 8/1993 | Baughman .......... F04D 27/0215 60/204 |
| 6,250,061 B1 | | 6/2001 | Orlando |
| 6,585,482 B1 | | 7/2003 | Liotta et al. |
| 6,647,730 B2 | | 11/2003 | Liu |
| 7,500,364 B2 | | 3/2009 | Schumacher et al. |
| 8,210,794 B2 | | 7/2012 | Nolcheff et al. |
| 9,091,173 B2 | | 7/2015 | Mosley et al. |
| 9,279,341 B2 | | 3/2016 | Durocher et al. |

(Continued)

*Primary Examiner* — Richard A Edgar
*Assistant Examiner* — Michael K. Reitz
(74) *Attorney, Agent, or Firm* — Fitch, Even, Tabin & Flannery LLP

(57) ABSTRACT

A compressor bleed port apparatus includes: a compressor shroud which defines a boundary between a primary flowpath and a plenum; a bleed port including one or more apertures passing through the compressor shroud, each of the one or more apertures having an inlet communicating with the primary flowpath and an outlet communicating with the plenum, and extending along a respective centerline. Each of the one or more apertures is bounded by sidewalls, and includes a diffuser section in which the sidewalls diverge from each other in a downstream direction; A diffusing angle between the sidewalls varies over the length of the diffuser section.

18 Claims, 7 Drawing Sheets

(56) References Cited

U.S. PATENT DOCUMENTS

| | | |
|---|---|---|
| 9,291,171 B2 | 3/2016 | Bunel et al. |
| 2013/0051974 A1 | 2/2013 | Poon et al. |
| 2014/0255181 A1* | 9/2014 | Ress, Jr. ............... F04D 29/083 |
| | | 415/213.1 |
| 2016/0003157 A1 | 1/2016 | Ott et al. |
| 2017/0108006 A1* | 4/2017 | Wilshaw ............... F01D 25/243 |
| 2017/0114794 A1 | 4/2017 | Duong et al. |
| 2017/0211586 A1* | 7/2017 | Gage .................... F04D 29/284 |
| 2017/0284676 A1 | 10/2017 | North et al. |

* cited by examiner

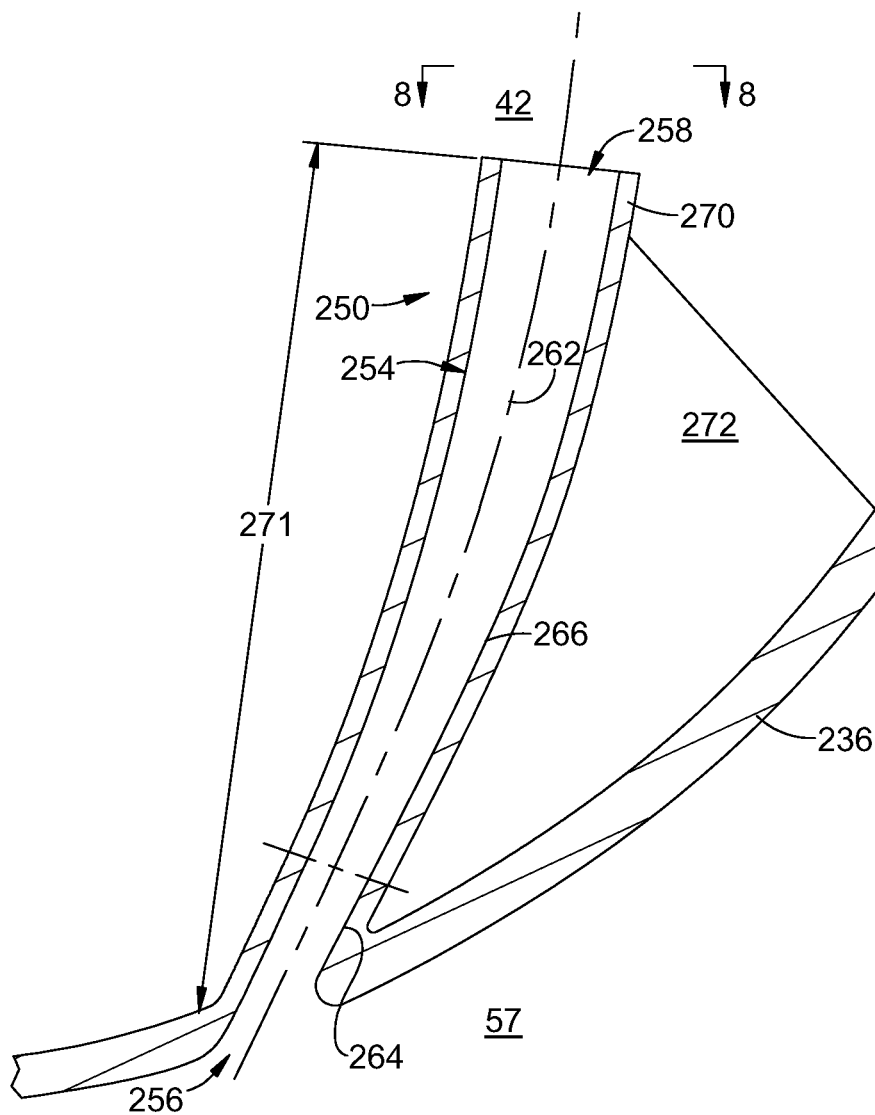
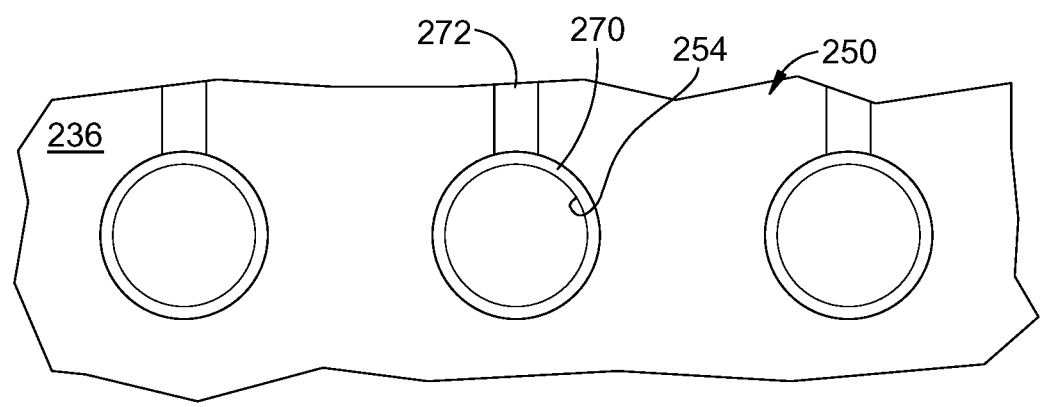
FIG. 8

COMPRESSOR BLEED PORT STRUCTURE

BACKGROUND OF THE INVENTION

This present invention relates generally to compressors, and more particularly, to air bleed structure in compressors.

A gas turbine engine includes a compressor, a combustor, and a turbine. Airflow entering the compressor is compressed and directed to the combustor where it is mixed with fuel and ignited, producing hot combustion gases used to drive the turbine.

Compressor bleed air, extracted through one or more bleed ports, is often used as a source of cooling air for the turbine and for other purposes within the engine or an associated vehicle.

However, extracting cooling air from the compressor may affect overall gas turbine engine performance. To minimize a reduction in engine performance, the cooling air is typically extracted from the lowest compressor stage that has a sufficient pressure for the turbine. Generally, because the temperature of air flowing through the compressor increases at each stage of the compressor, utilizing cooling air from the lowest allowable compressor stage results in a lower engine performance decrement as a result of such a cooling air extraction. Furthermore, cooling is more effective when the cooling air is extracted from a source having a lower temperature.

A bleed port may be either non-diffusing or diffusing. In the diffusing, the bleed port flowpath is shaped to cause a static pressure increase in the air flowing therein. For either type of bleed port, the bleed port discharge pressure is maximized when the aerodynamic losses of the port structure are minimized. Conversely, a bleed port structure discharge pressure will decrease with increased losses.

Typical prior art bleed ports are formed by drilling, electric discharge machining, etc. through the wall thickness of a compressor shroud, and thus have a limited variation in their shape. If a bleed port configuration is chosen to align with manufacturing tools, the aerodynamic design space will be limited. One problem with prior art bleed ports is that, given the limited shape variation, they may have greater than desired pressure losses. In some cases, these losses may require the bleed port to be positioned further downstream than would otherwise be desired.

BRIEF DESCRIPTION OF THE INVENTION

This problem is addressed by a compressor bleed port structure having a diffusing angle that varies along the passage length.

According to one aspect of the technology described herein, a compressor bleed port apparatus includes: a compressor shroud which defines a boundary between a primary flowpath and a plenum; a bleed port including one or more apertures passing through the compressor shroud, each of the one or more apertures having an inlet communicating with the primary flowpath and an outlet communicating with the plenum, and extending along a respective centerline; wherein each of the one or more apertures is bounded by sidewalls, and includes a diffuser section in which the sidewalls diverge from each other in a downstream direction. A diffusing angle between the sidewalls varies over the length of the diffuser section.

According to another aspect of the technology described herein, a compressor bleed port apparatus includes: a compressor shroud which defines a boundary between a primary flowpath and a plenum; a bleed port including one or more apertures passing through the compressor shroud, each of the one or more apertures having an inlet communicating with the primary flowpath and an outlet communicating with the plenum, and extending along a respective centerline. Each of the one or more apertures is bounded by sidewalls, and includes a diffuser section in which the sidewalls diverge from each other in a downstream direction. The centerline of at least one of the one or more apertures is curvilinear.

BRIEF DESCRIPTION OF THE DRAWINGS

The invention may be best understood by reference to the following description taken in conjunction with the accompanying drawing figures in which:

FIG. 7 is a schematic sectional view of another alternative bleed port apparatus;

FIG. 8 is a view taken along lines 8-8 of FIG. 7;

DETAILED DESCRIPTION OF THE INVENTION

Figure 1:
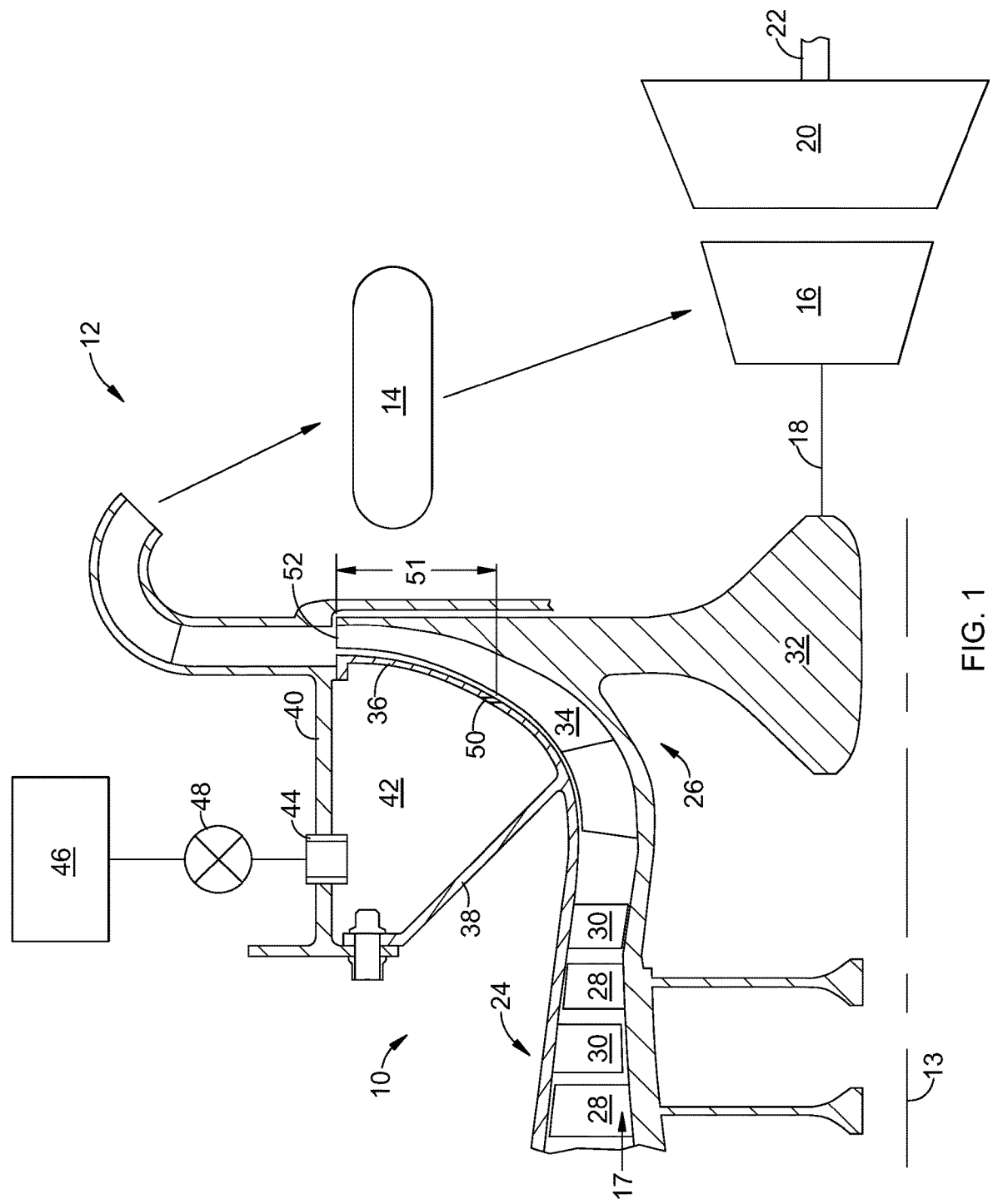
FIG. 1 is a schematic, half-sectional view of a gas turbine engine incorporating a compressor with a bleed port apparatus.

Referring to the drawings wherein identical reference numerals denote the same elements throughout the various views, FIG. 1 depicts an exemplary compressor 10. In the illustrated example, the compressor 10 is incorporated into a gas turbine engine 12 with a central longitudinal axis 13 and including in sequential flow sequence, the compressor 10, a combustor 14, and a gas generator turbine 16 (the combustor 14 and gas generator turbine 16 are shown schematically). As used herein, the terms "axial" and "longitudinal" both refer to a direction parallel to the longitudinal axis 13, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow labeled 17 in FIG. 1. These directional terms are used merely for convenience in description and do not require a particular orientation of the structures described thereby.

The compressor 10 provides compressed air that passes primarily into the combustor 14 to support combustion and partially around the combustor 14 where it is used to cool both the combustor liners and turbomachinery further downstream. Fuel is introduced into the forward end of the combustor 14 and is mixed with the air in a conventional fashion. The resulting fuel-air mixture flows into the combustor 14 where it is ignited to generate hot combustion gases. The hot combustion gases are discharged to the gas generator turbine 16 where they are expanded so that energy is extracted. The gas generator turbine 16 drives the compressor 10 through a shaft 18. In the illustrated example, the engine 12 is a turboshaft engine and a work turbine (also called a power turbine) 20 is located downstream of the gas generator turbine 16 and coupled to an output shaft 22 which can be connected to a mechanical load. However, the principles described herein are equally applicable to any compressor. For example, they may apply to a compressor in a different configuration of a gas turbine engine, or to a compressor driven by an external prime mover.

The compressor 10 includes an upstream portion 24 and a downstream portion 26. The upstream portion 24 of the compressor 10 is configured for axial fluid flow and may also be referred to as an axial-flow portion or simply an axial portion. It includes a number of stages, each of which includes a row of rotating airfoils or blades 28 and a row of stationary airfoils or vanes 30. The vanes 28 serve to turn the airflow exiting an upstream row of blades 30 before it enters the downstream row of blades 28. It is noted that this compressor 10 is merely an example and the principles described herein are applicable to any type of compressor, including, for example, a purely centrifugal or a purely axial compressor.

The downstream portion 26 of the compressor 10 is configured for centrifugal or mixed axial-centrifugal fluid flow and may be referred to as a centrifugal-flow portion or simply a centrifugal portion.

The downstream portion 26 includes an impeller 32 mounted for rotation with the shaft 18. An annular array of airfoil-shaped impeller blades 34 extend outward from the impeller 32. The impeller blades 34 are configured in terms of their dimensions, cross-sectional shape, orientation, spacing, and other parameters (in accordance with conventional practice) to provide an incremental pressure increase to the air flowing past them as the impeller 32 rotates.

An annular shroud 36 surrounds the impeller 32. A forward end of the shroud 36 includes a conical wall 38 which extends axially forward and radially outboard to join a compressor casing 40. The compressor casing 40, the conical wall 38, and the shroud 36 collectively define the boundaries of an annular plenum 42.

One or more offtake pipes 44 communicate with the plenum 42. The offtake pipes 44 are configured to deliver bleed air to an engine or aircraft system, shown schematically in the box labeled 46, where it may be used for various purposes such as cooling, actuation, or environmental control. This flow may be controlled or modulated by appropriate equipment such as the valve 48 shown schematically.

The shroud 36 includes a bleed port 50 positioned a distance 51 upstream from an exit 52 of the impeller 32. The distance 51 along the flowpath will vary depending upon the specific application based on pressure level requirements for the plenum 42 (these requirements are established based on knowledge of pressure level requirements for the system 46 and the losses in offtake pipes 44). The bleed port 50 permits recovery of a portion of air velocity head from inlet air entering compressor 10. The distance 51 is chosen such that the discharged pressure of bleed port 50 is at least a required static pressure level for the plenum 42.

Figure 2:
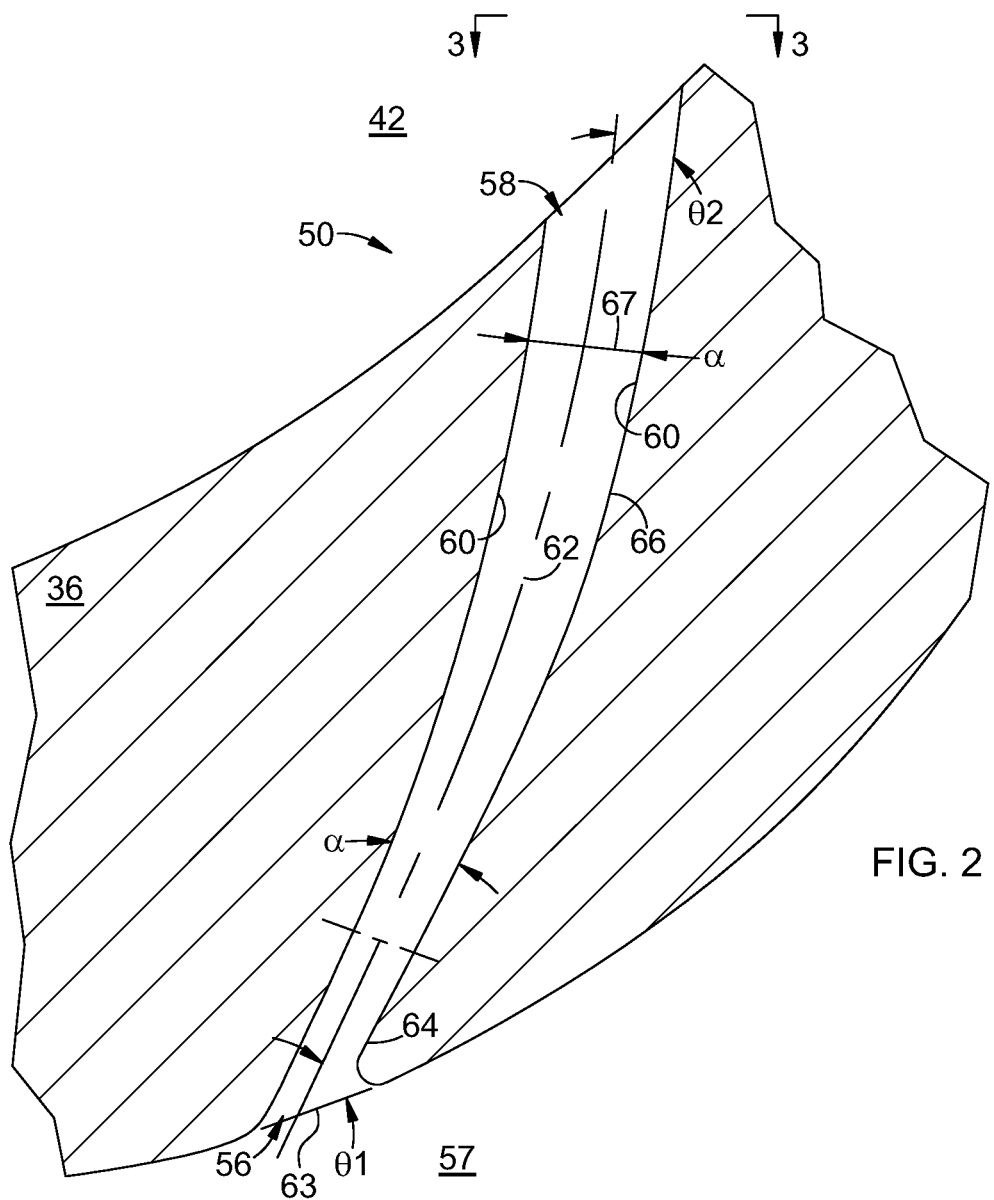
FIG. 2 is an enlarged view of a portion of FIG. 1 showing the bleed port apparatus in more detail.
Figure 3:
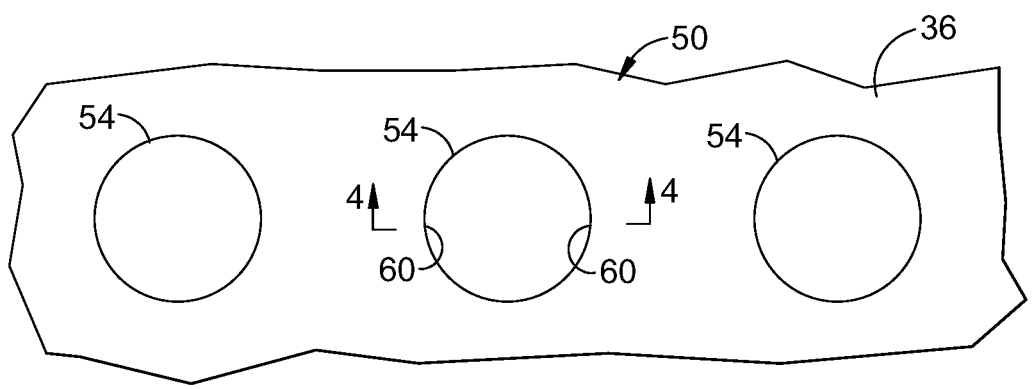
FIG. 3 is a view taken along lines 3-3 of FIG. 2.
Figure 4:
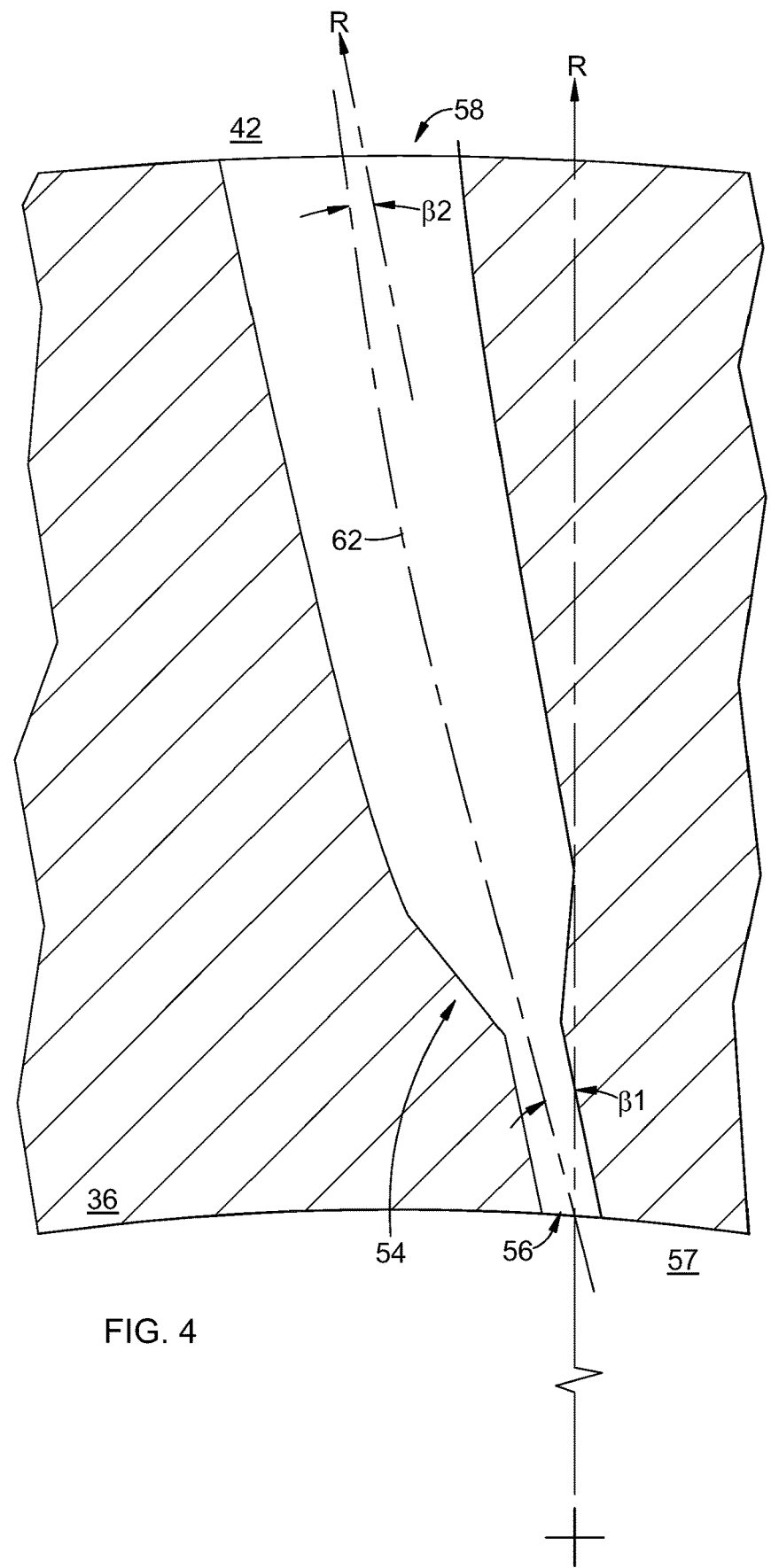
FIG. 4 is a view taken along lines 4-4 of FIG. 3.

FIGS. 2-4 illustrate the bleed port 50 and the surrounding structure in more detail. In this embodiment, the bleed port 50 is configured as an annular array of individual apertures 54 disposed around the circumference of the shroud 36. One of the individual apertures 54 will be described in detail, with the understanding that it is representative of all of the apertures 54.

The aperture 54 extends from an inlet 56 at the primary compressor flow path 57 to an outlet 58 communicating with the plenum 42. The lateral extents of the aperture 54 are bounded by sidewalls 60. The shape of the aperture 54 (i.e. the frontal area) may be various shapes such as a circle, an ellipsoid, or a polygon. Therefore, it will be understood that the sidewalls 60 may comprise a plurality of spaced-apart surfaces, or they may comprise a single continuous wall surface extending around a closed periphery.

A centerline 62 extends from the inlet 56 to the outlet 58. For any given axial location from the inlet 56 to the outlet 58, the centerline 62 passes through the centroid of the flow area of the aperture 54, at that axial location.

Adjacent the inlet 56, the centerline 62 is disposed at a nonparallel, non-perpendicular angle (designed "θ" generally) to the surface of the shroud 36. For reference purposes, the angle θ lies in an axial-radial plane, and is measured between a reference line 63 tangent to the surface of the shroud 36 and the centerline 62. This may be referred to as an "offtake angle". The value of the angle θ at the inlet 56 may be selected in accordance with conventional practices so as to extract or bleed air from the compressor primary flowpath 57 at a desired flowrate and temperature condition while minimizing pressure losses.

The aperture 54 includes a throat 64 at its upstream end, disposed immediately adjacent to and communicating with the inlet 56. Within the throat 64, the sidewalls 60 are parallel to each other such that the flow area is constant. The aperture 54 includes a diffuser section 66 downstream of the throat 64. Within the diffuser section 66, the sidewalls 60 diverge away from each other as they extend in the downstream direction towards the outlet 58. This increase in area causes flow diffusion, decreasing velocity and increasing static pressure, as flow passes downstream through the aperture 54.

The rate of diffusion is related to a "diffusion angle" between the sidewalls 60, labeled α in FIG. 2. For any given cross-sectional cutting plane 67 taken perpendicular to the centerline 62, the diffusion angle α is the angle between lines tangent to the sidewalls and intersecting the cutting plane 67.

In order to provide an appropriate diffusion rate while minimizing pressure losses, the diffusion angle α may vary along the passage length of the aperture 54. Stated another way, the sidewalls 60 can have a variable taper rather than a single straight taper.

If a variable taper is used, the diffuser section 66 may include a plurality of discrete segments each having a constant diffusion angle α within that segments, or the diffusion angle α may change continuously.

The diffusion angle α may be selected using appropriate design techniques for the particular application. For example, conventional computational fluid dynamics ("CFD") software or analytical methods may be used to model airflow through the aperture 54.

Analysis has shown that it is beneficial, in terms of reducing pressure losses, for the diffusion angle α to have a relatively larger value upstream or closer to the inlet 56, and to have a relatively lower value downstream or closer to the outlet 58. Stated another way, the diffusion angle α may have its maximum value directly downstream of the throat 64 and may gradually taper to lower values towards the outlet 58.

The flowpath of the aperture 54, as defined by the centerline 62, need not follow a straight line. Rather, all or a portion of the centerline 62 (and accordingly the sidewalls 60) may be curvilinear. This curvature may be used to reduce or eliminate flow separation which would otherwise occur if the centerline 62 were straight. FIG. 2 illustrates an example of the curved shape. For example, in a radial-axial plane, the centerline 62 is disposed at the first angle θ1, described above, adjacent the inlet 56, and is disposed at a second angle θ2 to the reference line 63, different from the first angle θ1, at the outlet 58. The second angle θ2 may be referred to as a "spouting angle". The radius and direction of the curvature may be selected using appropriate design techniques for the particular application. For example, CFD software or analytical techniques may be used to model airflow through the aperture 54.

It is noted that the aperture centerline 62 may extend at an angle, when viewed in a radial-tangential plane, other than purely radial. For example, in FIG. 4, the centerline 62 is shown as leaned in the tangential direction, forming an angle (designated "β" generally) relative to the radial direction R. Furthermore, the aperture centerline 62 may be curved when viewed in a radial-tangential plane. In the example shown in FIG. 4, the centerline 62 is disposed at the first angle β1 (i.e. tangential component of the offtake angle described above) adjacent the inlet 56, and is disposed at a second angle β2 (i.e. tangential component of the spouting angle described above), different from the first angle β1, at the outlet 58. Thus, both the offtake angle and the spouting angles may be three-dimensional parameters. The angles and curvature may be configured to provide a low resultant offtake angle at the off-take intersection with the primary flowpath 57, then approaching a functionally optimal spouting angle in three dimensions, which results in a low or zero swirl exiting flow. The apertures may also be curved to avoid mechanical obstructions.

Figure 5:
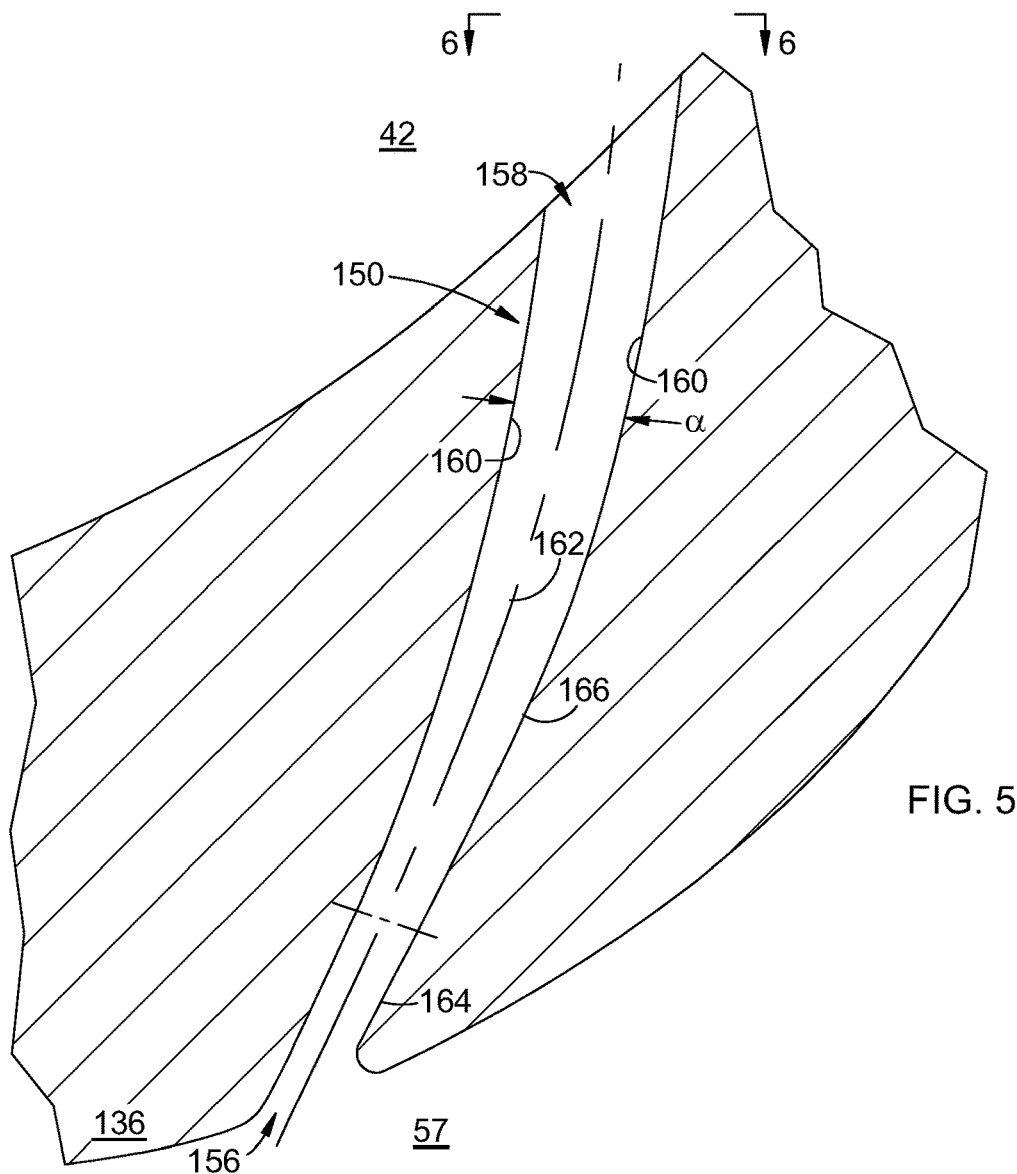
FIG. 5 is a schematic sectional view of an alternative bleed port apparatus.
Figure 6:
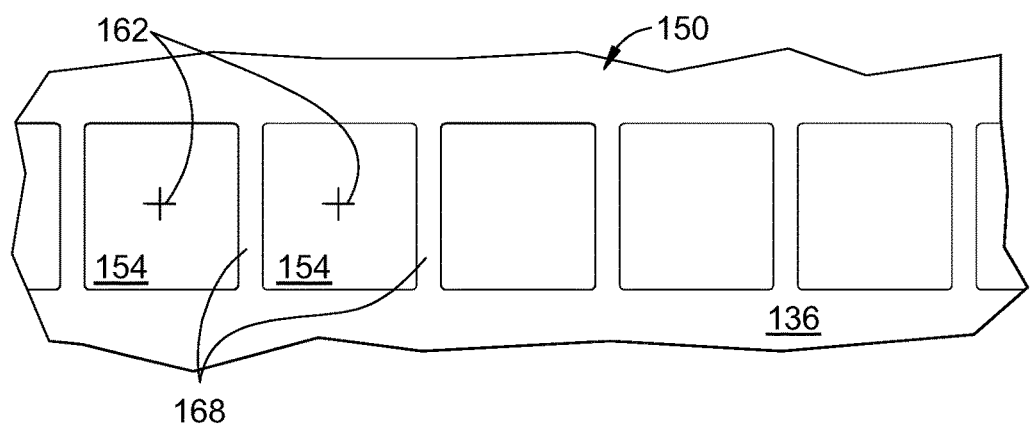
FIG. 6 is a view taken along lines 6-6 of FIG. 5.

FIGS. 5 and 6 illustrate an alternative configuration of a shroud 136 and bleed port 150. The shroud 136 and bleed port 150 are similar in construction to the shroud 136 described above. Elements of the shroud 136 not explicitly described may be considered to be identical to those of the shroud 36.

In this embodiment, the bleed port 150 is configured as a slot extending partially or wholly around the central longitudinal axis 13 (FIG. 1), and bounded by forward and aft sidewalls 160. The bleed port 150 may be described as arcuate or annular depending on its specific shape. The bleed port 150 extends from an inlet 156 at the primary compressor flow path 57 to an outlet 158 at the plenum 42.

The bleed port 150 has a centerline 162 and includes a throat 164 at its upstream end, disposed immediately adjacent to and communicating with the inlet 156. Within the throat 164, the sidewalls 160 are parallel to each other such that the flow area is constant. A diffuser section 166, in which the sidewalls 160 diverge, is disposed downstream of the throat 164. The diffusion angle (designated "α" generally) between the sidewalls 160 may be varying over the passage length as described above for the bleed port 150. The flowpath of the bleed port 150, as defined by the centerline 162 (and accordingly the sidewalls 160) may follow a curve over all or a part of its length, as described above for centerline 62.

Figure 11:
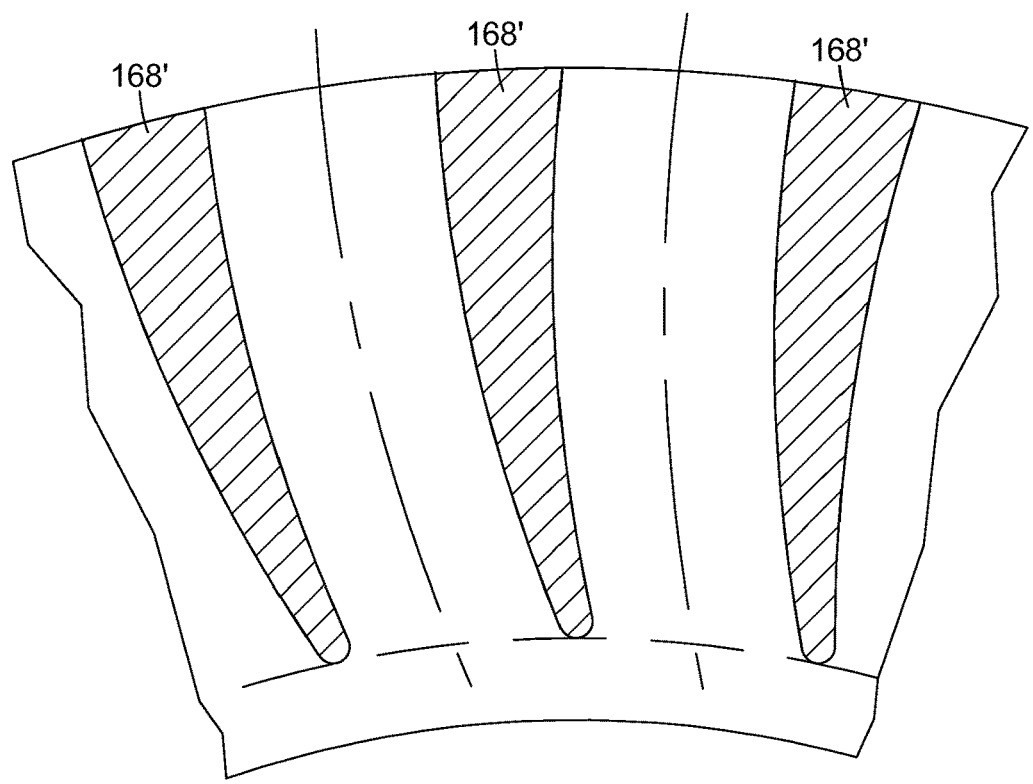
FIG. 11 is a sectional view illustrating a portion of an alternative vane configuration for a bleed port apparatus.
Figure 12:
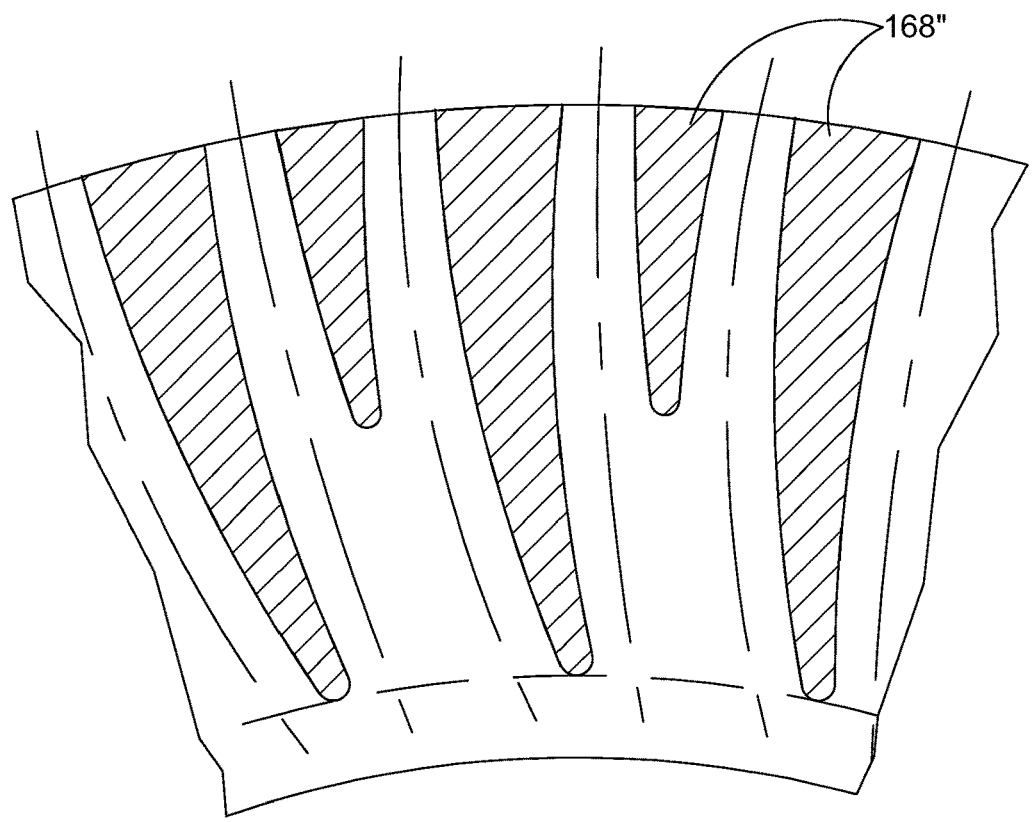
FIG. 12 is sectional view illustrating a portion of another alternative vane configuration for a bleed port apparatus.

The bleed port 150 may include plurality of vanes 168 which may divide the bleed port 150 into a plurality of individual apertures 154 each with its own centerline 162 as described above. In the case where such vanes 168 are not present, the bleed port 150 constitutes a single large aperture. The vanes 168 may be oriented in an appropriate angle in the tangential direction to de-swirl flow. The vanes 168 may be straight or cambered and may be configured as flat plates, streamlined shapes, or airfoil shapes. FIG. 11 illustrates one possible configuration of airfoil-shaped vanes, with a plurality of airfoil-shaped vanes 168' (shown in cross-section) of equal length. FIG. 12 illustrates another possible configuration, with a plurality of vanes 168" of unequal length, for example full-length vanes alternating with partial-length vanes. The orientation of the views in FIGS. 11 and 12 both correspond to the view orientation of FIG. 4. In FIG. 6, the vanes 168 are shown as extending all the way between the sidewalls 160, however alternatively the vanes 168 could extend from one of the sidewalls 160 only partially across the opening (i.e. they could be cantilevered).

In the embodiments shown in FIGS. 2-6, the structure of the bleed port has a length which is limited by the wall thickness of the shroud. It is also possible to construct a bleed port in such a manner that its length is independent of the wall thickness.

For example, FIGS. 7 and 8 illustrate an alternative configuration of a shroud 236 and bleed port 250. In this embodiment, the bleed port 250 is configured as an annular array of individual tubes 270 disposed around the circumference of the shroud 236. Each tube 270 defines an aperture 254. For purposes of description, the tubes 270 may be considered an example of a "port wall structure". The tubes 270 are spaced away from the wall of the shroud 236, and thus an overall length 271 of the tube 270 may be arbitrarily defined. In the illustrated example, a structural support 272 like a thin wall or web extends between each tube 270 and the shroud 236.

Each aperture 254 has a centerline 262 and extends from an inlet 256 at the primary compressor flow path 57 to an outlet 258 communicating with the plenum 42. The aperture 254 includes a throat 264 at its upstream end, disposed immediately adjacent to and communicating with the inlet 256, and a diffuser section 266 disposed downstream of the throat and communicating with the exit. The aerodynamic configuration of the aperture 254, including the variable diffusion angle and/or the curved centerline 262, may be implemented as described for the bleed port 50 described above.

Figure 9:
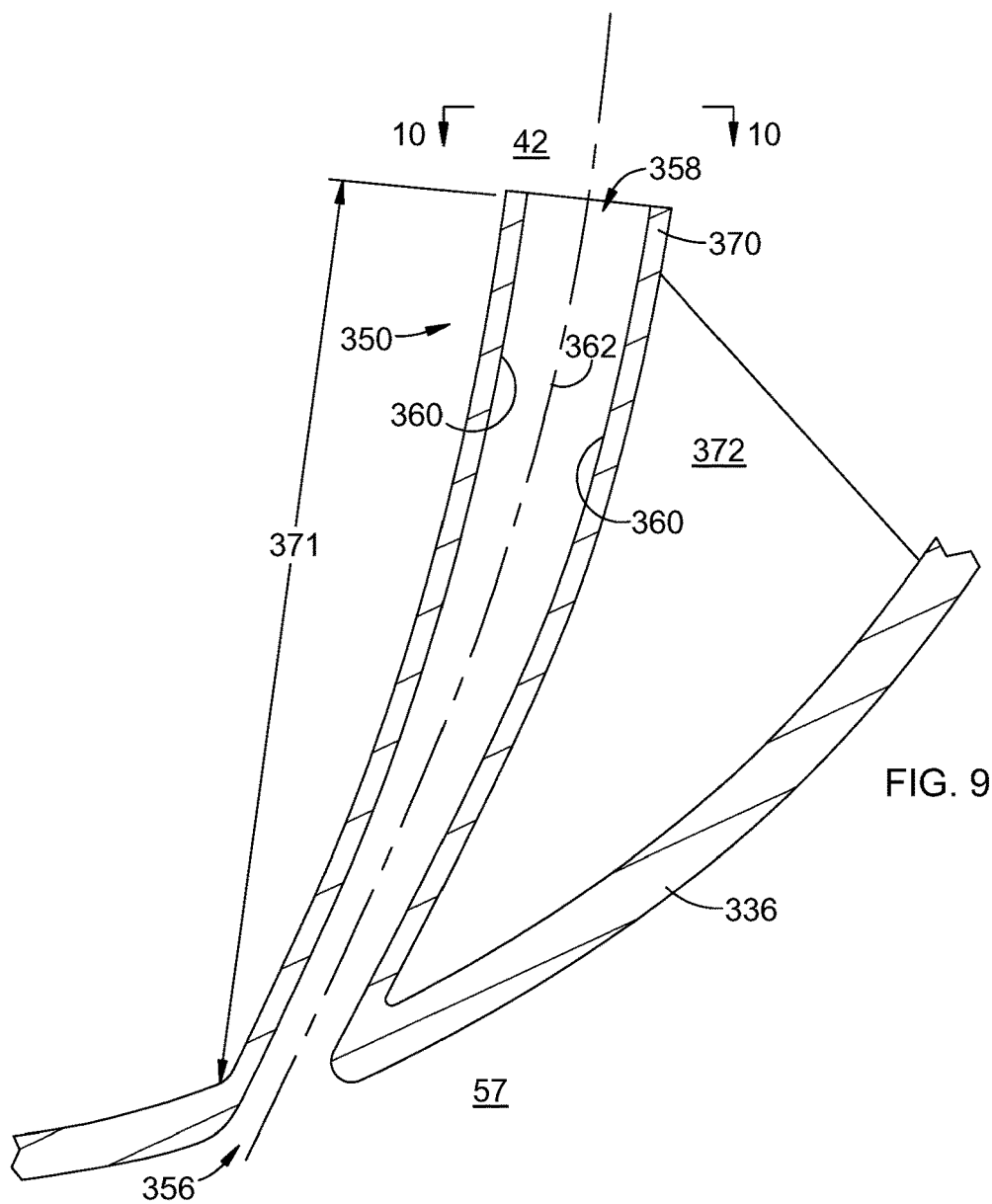
FIG. 9 is a schematic sectional view of another alternative bleed port apparatus.
Figure 10:
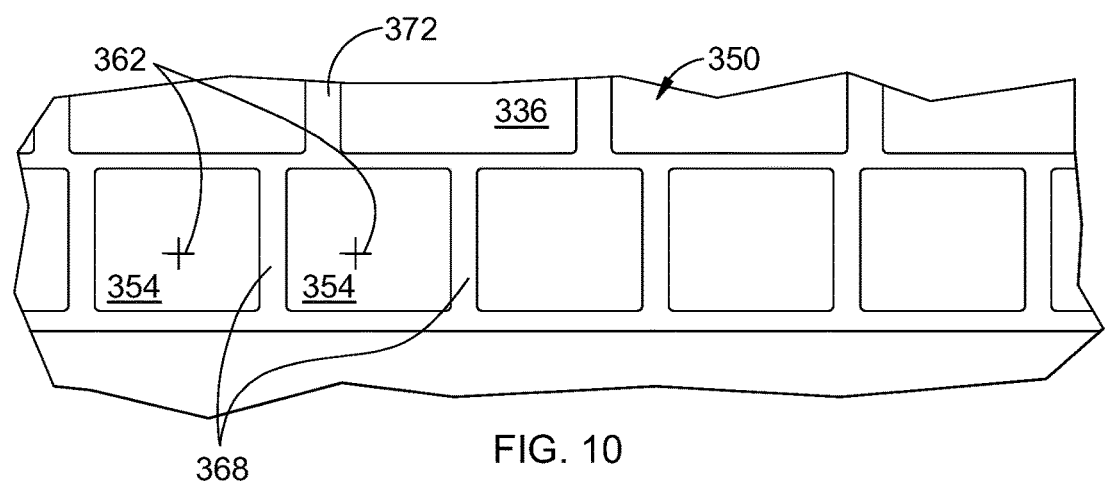
FIG. 10 is a view taken along lines 10-10 of FIG. 9.

FIGS. 9 and 10 illustrate another alternative configuration of a shroud 336 and bleed port 350, similar in construction to the shroud 236 described above. Elements of the shroud 336 not explicitly described may be considered to be identical to those of the shroud 236.

In this embodiment, the bleed port 350 is configured as a slot extending partially or wholly around the central longitudinal axis 13, and bounded by forward and aft sidewalls 360. The bleed port 350 extends from an inlet 356 at the primary compressor flow path 57 to an outlet 358 at the plenum 42. The sidewalls 360 are defined within a port wall structure 370 which is spaced away from the wall of the shroud 336, and thus an overall length 371 of the bleed port 350 may be arbitrarily defined. In the illustrated example, a plurality of structural supports 372 like thin walls or webs extend between the aft most sidewall 360 and the shroud 336.

The aerodynamic configuration of the aperture 354, including the variable diffusion angle and/or the curved centerline, may be implemented as described for the bleed port 50 described above.

The bleed port 350 may include plurality of vanes 368 which may divide the bleed port 350 into a plurality of individual apertures 354 each with its own centerline 362 as described above. In the case where such vanes 368 are not present, the bleed port 350 constitutes a single large aperture. The vanes 368 may be straight or cambered and may be configured as flat plates, streamlined shapes, or airfoil shapes, such as the shapes shown in FIGS. 11 and 12 The vanes 368 are shown as extending all the way between the sidewalls 360, however, alternatively, the vanes 368 could extend from one of the sidewalls 360 only partially across the opening (i.e. they could be cantilevered).

All or part of the shrouds, bleed ports, or both described above, or portions thereof, may be part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being used herein to refer generally to such processes. Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Stereolithography (SLA), Electron Beam Melting (EBM), Laser Engineered Net Shaping (LENS), and Direct Metal Deposition (DMD).

The bleed port structures described herein have advantages over prior art designs. They will achieve a higher level of diffusion enabling the placement of a turbomachinery bleed port to be placed in a region of lower temperature, decreasing the fuel consumption of an engine. Reducing the propensity for the diffusing air to separate on the passage walls by curving the centerline to reduce curvature, increases range of operation and pipe diffusion characteristics. This bleed port design does not depend on shroud thickness, reducing weight and maintaining structural rigidity.

The foregoing has described a bleed port apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A compressor bleed port apparatus, comprising:
    a compressor shroud which defines a boundary between a primary flowpath and a plenum;
    a bleed port including one or more apertures passing through the compressor shroud, each of the one or more apertures having an inlet communicating with the primary flowpath and an outlet communicating with the plenum, and extending along a respective centerline;
    wherein each of the one or more apertures is bounded by sidewalls, and includes a diffuser section in which the sidewalls diverge from each other in a downstream direction; and
    wherein a diffusing angle between the sidewalls varies over the length of the diffuser section and the diffusing angle has a maximum value at an upstream end of the diffuser section, and a lower value towards a downstream end of the diffuser section.

2. The apparatus of claim 1 wherein the bleed port further comprises a throat of constant flow area positioned upstream of the diffuser section.

3. The apparatus of claim 1 wherein the centerline of at least one of the one or more apertures is curvilinear.

4. The apparatus of claim 3 wherein the centerline of at least one of the one or more apertures is curved in at least two mutually perpendicular planes.

5. The bleed port apparatus of claim 1 wherein the bleed port is configured as a plurality of individual apertures.

6. The bleed port apparatus of claim 1 wherein the bleed port is configured as a continuous slot which defines the one or more apertures.

7. The bleed port apparatus of claim 6 further comprising a plurality of vanes disposed in the slot, defining a plurality of apertures.

8. The apparatus of claim 1 wherein the bleed port is defined within a port wall structure having a first end which joins the compressor shroud and a second end which is spaced away from a wall of the compressor shroud, such that the compressor shroud and the port wall structure define a generally wedge-shaped space therebetween, and the second end of the port wall structure does not contact the compressor shroud.

9. The apparatus of claim 8 wherein a structural support interconnects the port wall structure and the wall of the compressor shroud.

10. The apparatus of claim 1 further comprising an impeller mounted for rotation about a central longitudinal axis inside the compressor shroud.

11. A compressor bleed port apparatus, comprising:
    a compressor shroud which defines a boundary between a primary flowpath and a plenum;
    a bleed port including one or more apertures passing through the compressor shroud, each of the one or more apertures having an inlet communicating with the primary flowpath and an outlet communicating with the plenum, and extending along a respective centerline;
    wherein each of the one or more apertures is bounded by sidewalls, and includes a diffuser section in which the sidewalls diverge from each other in a downstream direction such that they define a diffusing angle between the sidewalls and the diffusing angle varies over the length of the diffuser section;
    wherein the centerline of at least one of the one or more apertures is curvilinear;
    wherein the bleed port is defined within a port wall structure having a first end which joins the compressor shroud and a second end which is spaced away from a wall of the compressor shroud, such that the compressor shroud and the port wall structure define a generally wedge-shaped space therebetween, and the second end of the port wall structure does not contact the compressor shroud; and wherein the diffusing angle has a maximum value at an upstream end of the diffuser section, and a lower value towards a downstream end of the diffuser section.

12. The apparatus of claim 11 wherein the centerline of at least one of the one or more apertures is curved in at least two mutually perpendicular planes.

13. The apparatus of claim 11 wherein the bleed port further comprises a throat of constant flow area positioned upstream of the diffuser section.

14. The bleed port apparatus of claim 11 wherein the bleed port is configured as a plurality of individual apertures.

15. The bleed port apparatus of claim 11 wherein the bleed port is configured as a continuous slot which defines the one or more apertures.

16. The bleed port apparatus of claim 15 further comprising a plurality of vanes disposed in the slot, defining a plurality of apertures.

17. The apparatus of claim 11 wherein a structural support interconnects the port wall structure and the wall of the compressor shroud.

18. The apparatus of claim 11 further comprising an impeller mounted for rotation about a central longitudinal axis inside the compressor shroud.

* * * * *